(No Model.)
G. AHLBORN.
RUBBER WHEEL TIRE.
No. 456,751. Patented July 28, 1891.
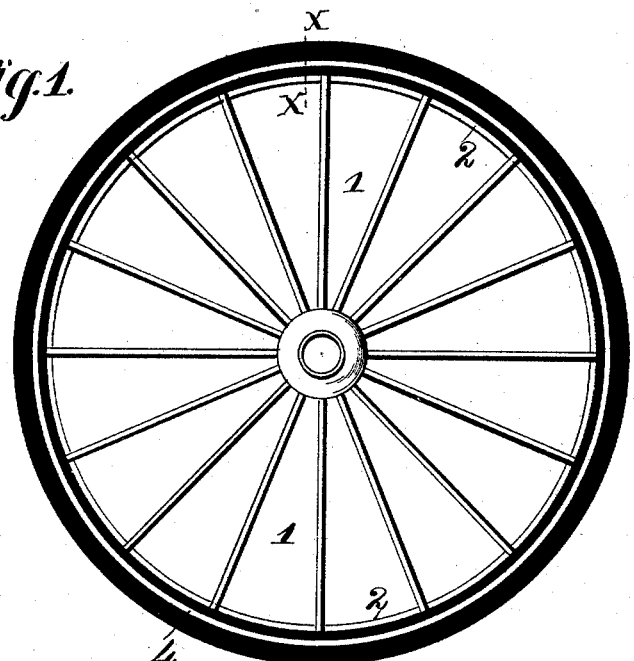
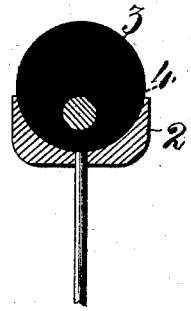
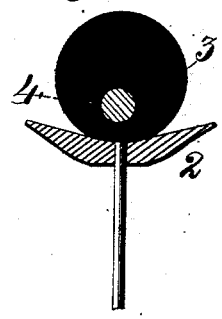
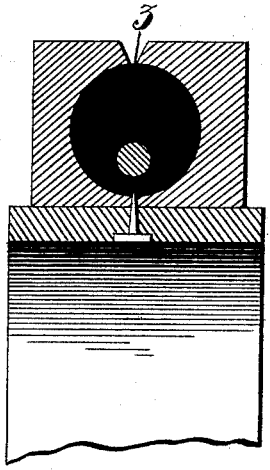
WITNESSES:
INVENTOR
George Ahlborn.
BY Higdon & Higdon
ATTORNEYS

UNITED STATES PATENT OFFICE.

GEORGE AHLBORN, OF ST. LOUIS, MISSOURI.

RUBBER WHEEL-TIRE.

SPECIFICATION forming part of Letters Patent No. 456,751, dated July 28, 1891.

Application filed December 13, 1890. Serial No. 374,583. (No model.)

*To all whom it may concern:*

Be it known that I, GEORGE AHLBORN, of the city of St. Louis and State of Missouri, have invented certain new and useful Improvements in Tires, of which the following is a full, clear, and exact description, reference being had to the accompanying drawings, forming a part hereof.

My invention relates to improvements in rubber tires; and it consists in the novel construction and combination of parts, as will be more fully hereinafter described, and designated in the claim.

In the drawings, Figure 1 is a diametrical section of a rim and tire having my invention applied thereto. Fig. 2 is an enlarged transverse section through the rubber tire, metallic core, or tightening-wire eccentrically located in the same, and also the metallic rim of the wheel. Fig. 3 is a similar cross-section through like parts with the lateral flanges of the rim straightened out. Fig. 4 is a cross-section of a mold for making my improved rubber tire.

In carrying out my invention I construct an elastic supplemental tire for bicycles, velocipedes, carriage-wheels, &c., or to be used in the construction of vehicle-wheels, in which a degree of elasticity is obtained in the tread, while the rigidity of the metallic rim is retained to keep the wheel in proper shape.

Referring to the drawings, 1 represents an ordinary wheel with my improved rubber tire secured thereto in the manner as hereinafter described.

2 indicates the rim of said wheel. Said rim is made of a suitable sheet of metal provided with tapering edges, which edges are bent upwardly after the tire is placed on the rim to hold said tire in position. The ordinary spokes are substantially and mechanically secured in the median portion of said rim.

3 represents the rubber tire, in which and nearer the lower surface thereof is secured an endlesss metallic wire 4, the tension of which holds the rubber tire in its appropriate convex depression, while at the same time its elasticity will permit it, and consequently the tire in which it is located, to pass over the upturned flanges of the rim, and the tension will hold it in its normal position. Said wire 4 is located in rubber tire 3 in the process of manufacturing the same. Said tire is constructed in a suitable mold. The operation of making it is as follows: Preferably by taking an endless wire suspended in a suitable mold and pouring or packing the melted rubber around it. By this process the metallic wire is entirely hidden from view, and its insertion in said rubber is not effected by cutting and disfiguring the same, as has been done heretofore.

Having fully described my invention, I will now proceed to describe its application and use.

The rubber tire is constructed in a suitable way, or in the way as hereinbefore described, and it is expanded and stretched over the rim 2 of the wheel. The tension of the rubber, and also the additional tension of the wire located therein, will hold said tire tightly in its appropriate convex depression on said rim, or the flanges may be straightened out, as shown in Fig. 3, the rubber tire then placed on the rim, and said flanges turned upwardly against said tire and hold said tire rigidly in its desired position.

If it was intended to make such use of the wheel that the tire would be subjected to no very great amount of wear, the first of the above methods of securing the tire would be satisfactory. Should it be desired, however, to make a wheel capable of withstanding rougher usage, the latter method should be employed, because it would be necessary to make the wire shorter.

I locate the endless metallic stiffening-wire 4 in the rubber eccentrically with relation to the body of said rubber because I have found that by so doing I avoid any interference with the elasticity of the greater body of the rubber and permit it to retain position undisturbed where it will do the most good.

I am aware that heretofore metallic wires of various forms have been inserted in rubber tires—for instance, by cutting the rubber to form openings therein, by locating centrally in the rubber tire an endless band of wire during the molding operation, and by eccentrically locating a rope of textile material or one or more wavy or corrugated wires in the rubber tire—but such constructions do not answer the purpose of my invention, and I make no claim to them.

In my invention I use a continuous endless wire inserted in the rubber tire in the process of making the same, thereby forming no external openings for the introduction of various foreign substances.

My improved tire with the endless rod of metal therein greatly strengthens the rim of the wheel, making it stiffer and less liable to "buckle," also heavier, and draws the spokes tighter, making the wheel to which it is applied stronger all around, which could not occur were the rod made of textile material or non-metallic substances.

The only object of my improved tire is to hold itself in position upon the rim without the use of the cement commonly employed for this purpose and to strengthen the wheel, as above mentioned.

Having fully described my invention, what I claim is—

The improved tire and securing device therefor, consisting of a rim 2, made of flat sheet metal and having metallic spokes secured therein, and the rubber tire 3, having an endless straight metallic stiffening-wire 4, eccentrically molded therein, located at a distance from the center of the body of the rubber and arranged near the surface of the wheel-rim, the flanges upon the edges of said rim being adapted to be turned upwardly against said tire, overlapping or extending beyond said wire core, substantially as set forth.

In testimony whereof I affix my signature in presence of two witnesses.

GEORGE AHLBORN.

Witnesses:
C. K. JONES,
FRANK BRODEY.